(12) United States Patent
Drzymala et al.

(10) Patent No.: US 9,245,425 B2
(45) Date of Patent: Jan. 26, 2016

(54) PRODUCE LIFT APPARATUS

(71) Applicant: Symbol Technologies, Inc., Schaumburg, IL (US)

(72) Inventors: Mark E. Drzymala, St. James, NY (US); Edward D. Barkan, Miller Place, NY (US)

(73) Assignee: Symbol Technologies, LLC, Holtsville, NY (US)

( * ) Notice: Subject to any disclaimer, the term of this patent is extended or adjusted under 35 U.S.C. 154(b) by 274 days.

(21) Appl. No.: 13/778,939

(22) Filed: Feb. 27, 2013

(65) Prior Publication Data

US 2014/0224554 A1    Aug. 14, 2014

Related U.S. Application Data

(60) Provisional application No. 61/764,803, filed on Feb. 14, 2013.

(51) Int. Cl.
| | |
|---|---|
| *G06K 7/10* | (2006.01) |
| *G07G 1/00* | (2006.01) |
| *G01G 19/414* | (2006.01) |

(52) U.S. Cl.
CPC ............ *G07G 1/0072* (2013.01); *G06K 7/1096* (2013.01); *G01G 19/4144* (2013.01)

(58) Field of Classification Search
CPC .. A47F 9/04; G06K 7/10861; G01G 19/4144; G01G 21/28; G01G 21/283; G07G 1/0072
See application file for complete search history.

(56) References Cited

U.S. PATENT DOCUMENTS

| | | | | | |
|---|---|---|---|---|---|
| 4,881,606 | A | * | 11/1989 | Halfon et al. | 177/126 |
| 5,410,108 | A | * | 4/1995 | Williams et al. | 177/25.15 |
| 5,773,767 | A | * | 6/1998 | Collins et al. | 177/126 |
| 6,085,979 | A | * | 7/2000 | Maddox | 235/462.13 |
| 6,155,489 | A | * | 12/2000 | Collins et al. | 235/462.01 |
| 6,830,186 | B1 | * | 12/2004 | Nahar | 235/462.14 |
| RE40,071 | E | | 2/2008 | Svetal et al. | |
| 7,841,524 | B2 | | 11/2010 | Schmidt et al. | |
| 8,113,431 | B2 | | 2/2012 | Gregerson | |
| 2006/0131416 | A1 | * | 6/2006 | Jwo | 235/454 |
| 2007/0152061 | A1 | * | 7/2007 | Blanford | 235/462.32 |
| 2009/0039166 | A1 | * | 2/2009 | Herwig et al. | 235/462.42 |
| 2010/0116887 | A1 | * | 5/2010 | Barkan et al. | 235/440 |
| 2010/0139989 | A1 | * | 6/2010 | Atwater et al. | 177/245 |
| 2010/0163627 | A1 | * | 7/2010 | Olmstead | 235/470 |
| 2011/0132985 | A1 | * | 6/2011 | McQueen et al. | 235/454 |
| 2011/0168780 | A1 | | 7/2011 | McQueen et al. | |
| 2012/0138672 | A1 | | 6/2012 | Herwig | |
| 2013/0075168 | A1 | * | 3/2013 | Amundsen et al. | 177/1 |

\* cited by examiner

*Primary Examiner* — Peter Macchiarolo
*Assistant Examiner* — Natalie Huls
(74) *Attorney, Agent, or Firm* — Nong-Qiang Fan (57) ABSTRACT

A workstation includes a first window located in an upright plane, a second window located in a generally horizontal plane that intersects the upright plane, and a controller operative to read a barcode, and a weighing system having a horizontal platter operative to measure the weight of produce exerting gravitational force on the horizontal platter. The workstation also includes a four-bar apparatus having a front bar, a back bar, a first side bar, and a second side bar all atop the horizontal platter. The four-bar apparatus is operative to be settled into one of a first configuration and a second configuration. The upper edge of each of the front bar, the back bar, the first side bar, and the second side bar has an average height at the second configuration larger than its average height at the first configuration.

15 Claims, 8 Drawing Sheets

PRODUCE LIFT APPARATUS

RELATED APPLICATIONS

The present application is related to claims benefit under 35 U.S.C. §119(e) from U.S. Provisional Patent Application Ser. No. 61/764,803, filed Feb. 14, 2013, titled "PRODUCE LIFT APPARATUS", the entire contents of which being incorporated herein by reference.

FIELD OF THE DISCLOSURE

The present invention relates to barcode scanning workstation having at least two windows.

BACKGROUND

Various electro-optical systems have been developed for reading optical indicia, such as bar codes. A bar code is a coded pattern of graphical indicia comprised of a series of bars and spaces of varying widths, the bars and spaces having differing light reflecting characteristics. The pattern of the bars and spaces encode information. Bar code may be one dimensional (e.g., UPC bar code) or two dimensional (e.g., DataMatrix bar code). Systems that read, that is, image and decode bar codes employing imaging camera systems are typically referred to as imaging-based bar code readers or bar code scanners.

Imaging-based bar code readers may be portable or stationary. A portable bar code reader is one that is adapted to be held in a user's hand and moved with respect to target indicia, such as a target bar code, to be read, that is, imaged and decoded. Stationary bar code readers are mounted in a fixed position, for example, relative to a point-of-sales counter. Target objects, e.g., a product package that includes a target bar code, are moved or swiped past one of the one or more transparent windows and thereby pass within a field of view of the stationary bar code readers. The bar code reader typically provides an audible and/or visual signal to indicate the target bar code has been successfully imaged and decoded. Sometimes barcodes are presented, as opposed to be swiped.

A typical example where a stationary imaging-based bar code reader would be utilized includes a point of sale counter/cash register where customers pay for their purchases. The reader is typically enclosed in a housing that is installed in the counter and normally includes a vertically oriented transparent window and/or a horizontally oriented transparent window, either of which may be used for reading the target bar code affixed to the target object, i.e., the product or product packaging for the product having the target bar code imprinted or affixed to it. The sales person (or customer in the case of self-service check out) sequentially presents each target object's bar code either to the vertically oriented window or the horizontally oriented window, whichever is more convenient given the specific size and shape of the target object and the position of the bar code on the target object.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIGS. 4A-4B and 5A-5B illustrate a multi-planer scanner that includes a produce lift apparatus in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Figure 1:
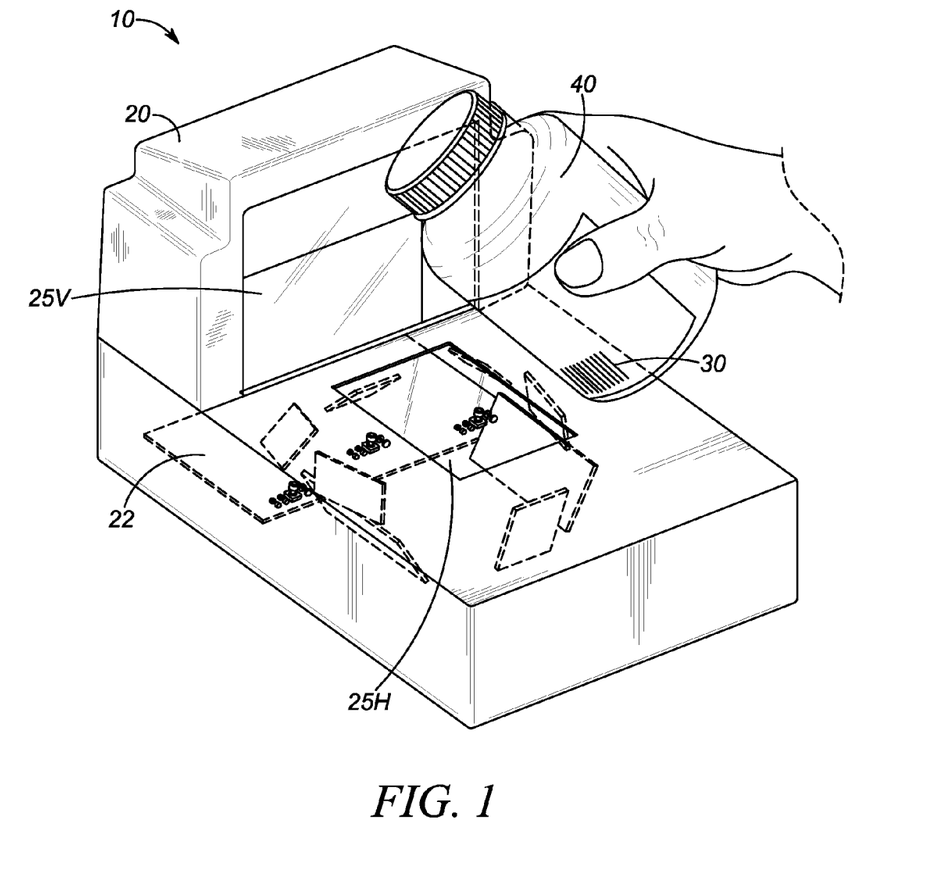
FIG. 1 depicts a workstation in accordance with some embodiments.

FIG. 1 depicts a workstation 10 in accordance with some embodiments. The workstation 10 is stationary and includes a housing 20. The housing 20 has a generally horizontal window 25H and a generally vertical window 25V. In one implementing, the housing 20 can be integrated into the sales counter of a point-of-transaction system. The point-of-transaction system can also includes a cash register, a touch screen visual display, a printer for generating sales receipts, or other type user interface. The workstation often includes weighing scale 46 incorporated within the housing 20. A horizontal platter 80 is coupled with the weighing scale 46 for weighing a product placed on the horizontal platter 80. The workstation 10 can be used by retailers to process transactions involving the purchase of products bearing an identifying target, such as UPC symbols.

In accordance with one use, an operator can slide or swipe the product 40 past one of the windows (e.g., 25H or 25V) from right to left, or from left to right, in a "swipe" mode, to let an image of the barcode 40 on the product 42 be captured by the workstation 10. Alternatively, the operator can present the barcode 30 on the product 40 to the center of the window 25V in a "presentation" mode. The choice depends on operator preference or on the layout of the workstation. Upon a successful reading of the target bar code, a visual and/or audible signal will be generated by the workstation 10 to indicate to the user that the target bar code 30 has been successfully imaged and decoded.

Figure 2:
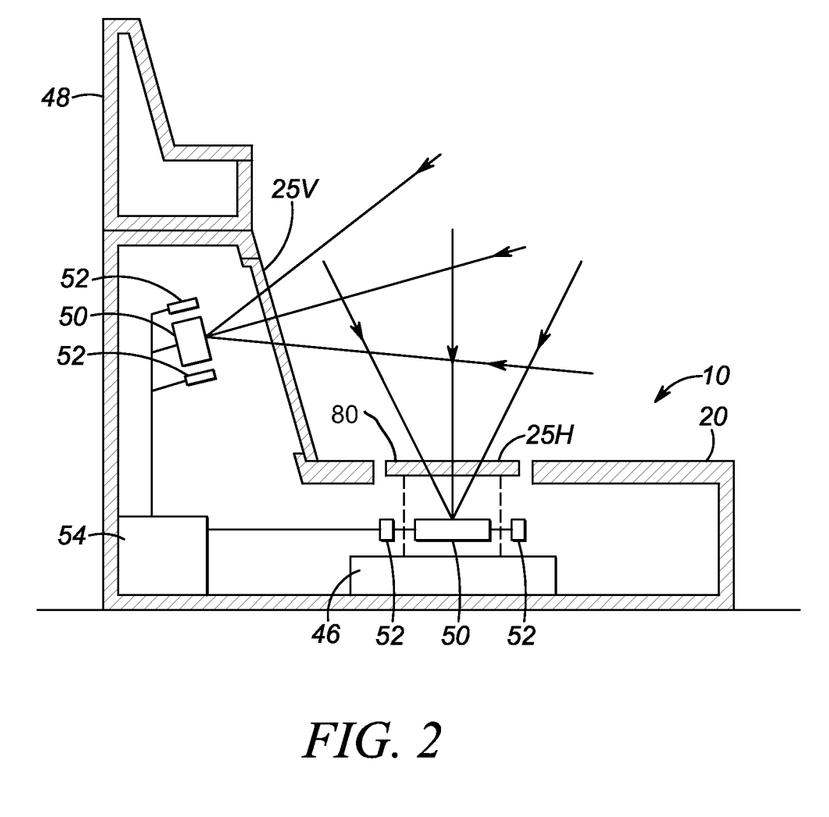
FIG. 2 is a schematic of a multi-planer workstation that includes a plurality of solid-state imagers in accordance with some embodiments.

As schematically shown in FIG. 2, a plurality of solid-state imagers 50, each including an illuminator 52, are mounted at the workstation 10, for capturing light passing through either or both windows from a target which can be a one- or two-dimensional symbol, such as a two-dimensional symbol on a driver's license, or any document, as described below. Each imager 50 is a solid-state area array, preferably a CCD or CMOS array. The imagers 50 and their associated illuminators 52 are operatively connected to a programmed microprocessor or controller 54 operative for controlling the operation of these and other components. Preferably, the microprocessor is the same as the one used for decoding the return light scattered from the target and for processing the captured target images.

In operation, the microprocessor 54 sends successive command signals to the illuminators 52 to pulse the LEDs for a short time period of 100 microseconds or less, and successively energizes the imagers 50 to collect light from a target only during said time period, also known as the exposure time period. By acquiring a target image during this brief time period, the image of the target is not excessively blurred.

The illumination source 54 usually is energized to address low ambient light conditions and to minimize hand jitter impact or swiping objects though the FOV on reading performance. On the other hand having bright illumination of an imaging scanner in constantly on state is annoying and bothersome for the user. It is also not efficient from power management perspective. Therefore it is beneficial to have an object sensing system which energizes illumination system only if the object of interest is presented within the predetermined FOV of the imaging scanner 50 and at a certain distance from the scanner. The object detecting system usually includes an infrared LED and a photodetector. When an object is presence in an object field of view of the object detecting system, light projected upon such object will be reflected and scattered back towards the object detecting system, and the reflected and scattered light will be detected by the photodetector of the object detecting system.

As previously stated, FIG. 2 is only a schematic representation of an all imager-based workstation as embodied in a multi-planer workstation with two windows. The workstation can have other kinds of housings with different shapes. The workstation can have one window, two windows, or with more than two windows. In some embodiments, the workstation can include between three to six solid-state imagers. The multi-planer workstation can also include more than six solid-state imagers. A multi-planer workstation can also have multiple subfields of views from each window to provide optimum visibility of a target barcode on the various sides of the product 40 being passed through the scan zone.

Figure 3:
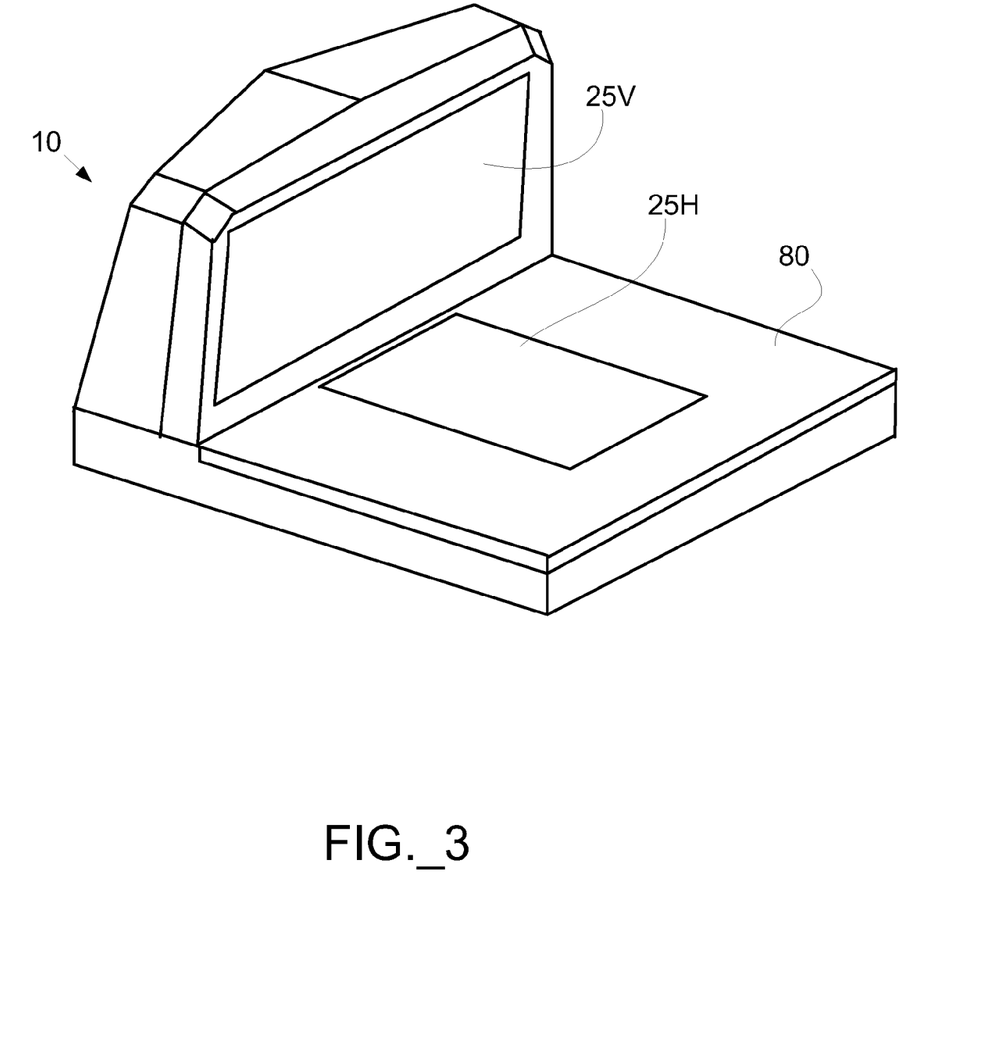
FIG. 3 shows a multi-planer scanner that includes a platter for weighing produce in accordance with some embodiments.

FIG. 3 shows that the multi-planer workstation 10 often includes a platter 80 for weighing produce. The platter 80 is typically a flat horizontal surface. When produce is placed on the platter 80, it may roll to the front, side or back. A mechanism is needed to keep the produce from rolling completely off the platter 80, or from rubbing against the vertical window or from touching the counter top on either side of the scale platter, which would result in an inaccurate measurement.

Figure 4A:
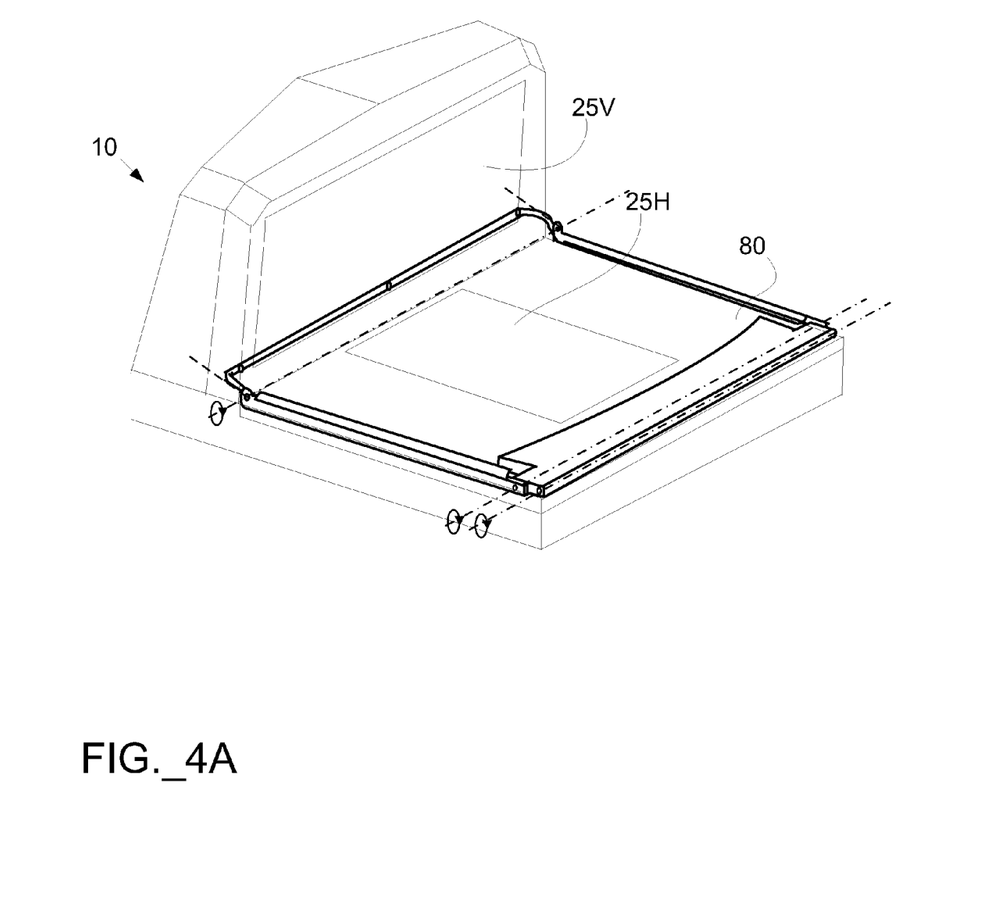
Figure 5A:
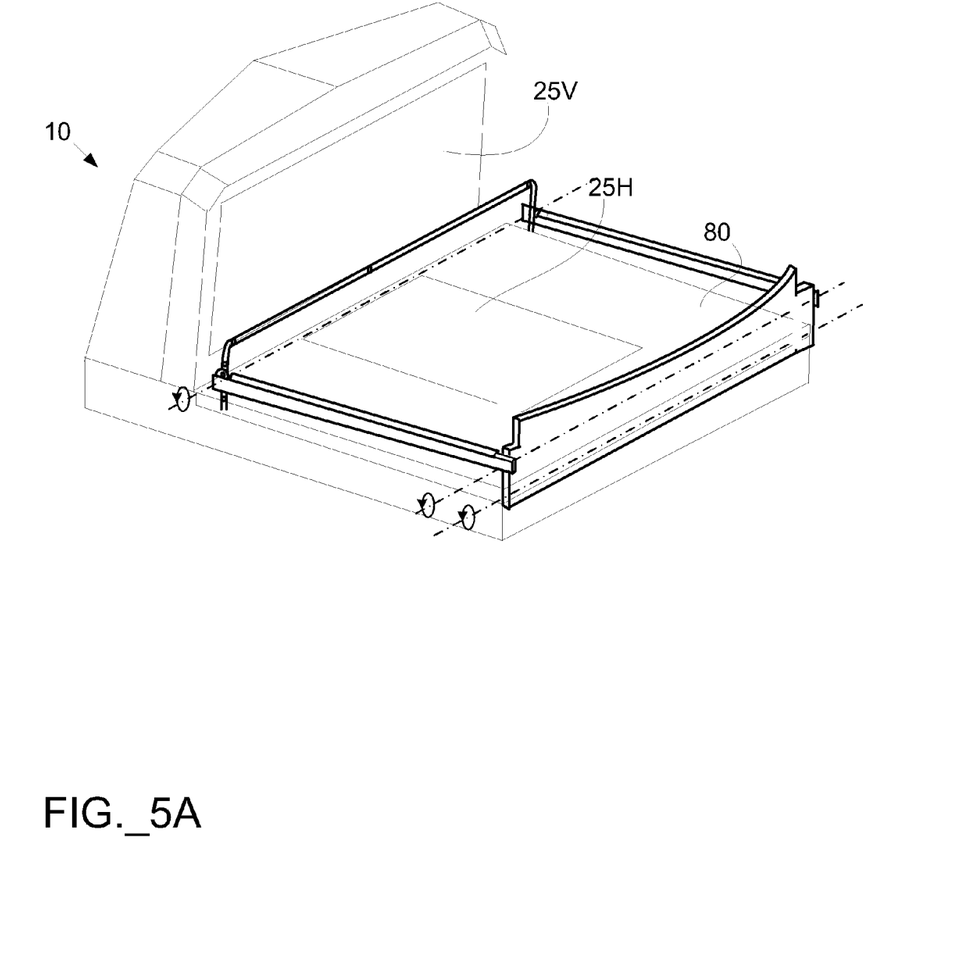
Figure 5B:
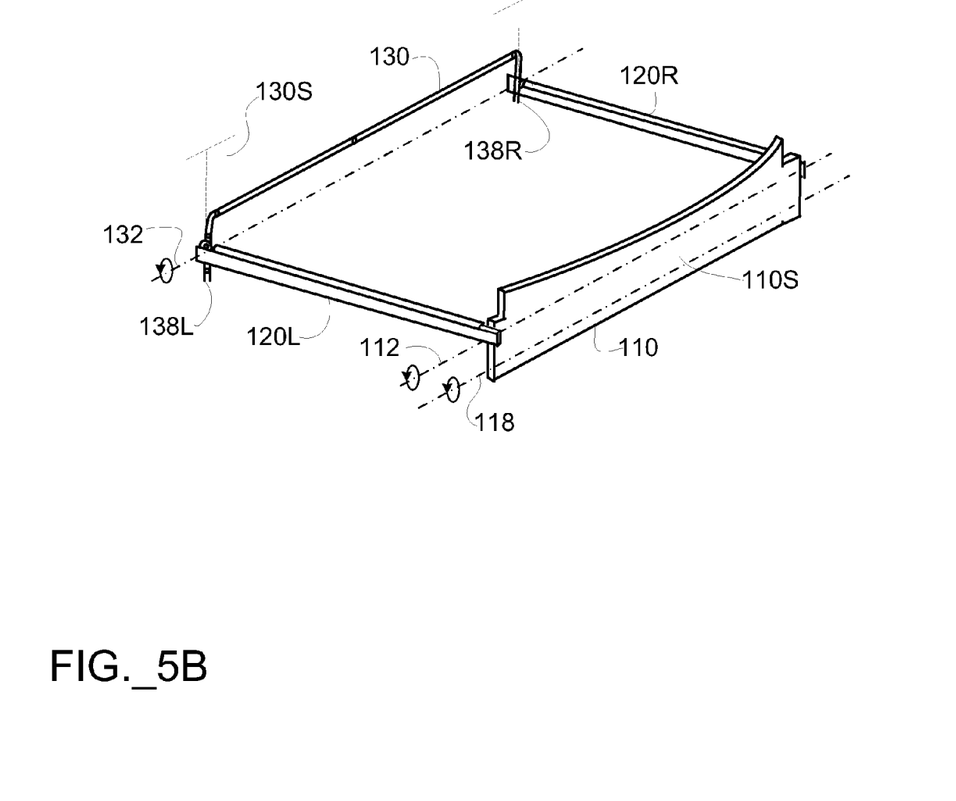

FIGS. 4A-4B and 5A-5B illustrate a multi-planer workstation 10 that includes a produce lift apparatus in accordance with some embodiments. The produce lift apparatus as shown are implemented as a simple four bar mechanism that has two positions. In the normal state as shown in FIGS. 4A-4B, the mechanism is in the down position while scanning products across the platter. In this position none of the four sides of the mechanism will interfere with scanning. In the weighing state as shown in FIGS. 5A-5B, the mechanism is in the up position for weighing. The four bar mechanism is pulled up by the cashier when weighing produce. The four bar mechanism does not allow the produce to hit the vertical window, roll off to the side or the back of the platter.

In the weighing state as shown in FIGS. 5A-5B, the four bar mechanism enables placing long produce such as celery across the scanner, left to right, while holding the produce up off the conveyor belt or counter top on either side of the scanner so as to assure accurate weighing. The four bar mechanism also keeps produce from touching the vertical window 25V of the scanner during weighing, as touching of the vertical window 25V would degrade weighing accuracy. Retailers are very concerned about scale inaccuracy that can occur when the produce being weighed touches a stationary object adjacent to the scale platter (such as the vertical window or the counter-top into which the scanner is mounted) because it usually results in under-weighing the produce, making it appear as if the produce weighs less than it really does. Since the price of the produce is based on weight, under-weighing results in under-charging, costing the store money. Consequently, the retailers often are willing to pay extra for a scale platter that helps eliminate under-weighing.

In the weighing state as shown in FIGS. 5A-5B, the four bar mechanism also keeps produce from rolling off the platter 80, avoiding the need for operators to waste time to position the produce such that it won't roll off the platter. Wasted time costs the retailers money, further justifying the cost of implementing the four bar mechanism on the multi-planer scanner.

As shown in FIGS. 4A-4B, the four bars atop the platter 80 can be easily folded down flush with the platter 80 so as to not restrict sliding items over the platter for easy and fast barcode scanning. In some existing conventional designs, a concave platter is used. Such concave platter, however, may discourage rapid swiping, wasting time, and encourage users to lift the swiped items while scanning instead of sliding the items. Lifting is tiring and promotes repetitive motion health issues, which retailers want to avoid.

In one implementation as shown in FIGS. 4A-4B and FIGS. 5A-5B, the multi-planer workstation 10 includes a four-bar apparatus that has a front bar 110, a back bar 130, a first side bar 120L, and a second side bar 120R all atop the horizontal platter 80. This four-bar apparatus can be settled into one of a first configuration as shown in FIGS. 4A-4B and a second configuration as shown in FIGS. 5A-5B. In the first configuration as shown in FIGS. 4A-4B, the front bar 110, the back bar 130, the first side bar 120L, and the second side bar 120R are all lowered to be close to the surface of the horizontal platter 80. In the second configuration as shown in FIGS. 5A-5B, the front bar 110, the back bar 130, the first side bar 120L, and the second side bar 120R are all raised substantially above the surface of the horizontal platter 80. Generally, as shown in FIGS. 4A-4B and FIGS. 5A-5B, the upper edge of each of the front bar 110, the back bar 130, the first side bar 120L, and the second side bar 120R has an average height at the second configuration that is significantly larger than the average height of the upper edge in that specific bar at the first configuration.

In some implementations, the first side bar 120L and the second side 120R are predominantly positioned below the upper surface of the horizontal platter 80 when the four-bar apparatus is settled into the first configuration. For examples, in FIGS. 4A-4B, only the upper edges of the first side bar 120L and the second side 120R are above the upper surface of the horizontal platter 80. In some implementations, the first side bar 120L and the second side 120R are predominantly positioned above the upper surface of the horizontal platter 80 when the four-bar apparatus is settled into the first configuration. For example, in FIGS. 5A-5B, substantially the entire body of the first side bar 120L and the second side bar 120R are raised above the upper surface of the horizontal platter 80.

In some implementations, the front bar 110 includes a strip of plate. When the four-bar apparatus is settled into the first configuration as shown in FIGS. 4A-4B, the plate surface of the front bar 110 is substantially parallel to the surface of the horizontal platter 80. When the four-bar apparatus is settled into the second configuration as shown in FIGS. 5A-5B, the plate surface of the front bar 110 is substantially perpendicular to the surface of the horizontal platter 80. In other implementations (not shown in the figures), when the four-bar apparatus is settled into the second configuration, the plate surface of the front bar 110 is not perpendicular to the surface of the horizontal platter 80 but it forms an inclined angle of more than 45 degrees with respect to the surface of the horizontal platter 80.

In some implementations, as shown in FIGS. 4A-4B and FIGS. 5A-5B, the back bar 130 includes a U-shaped tube that is bended within a bending plane 130S. When the four-bar apparatus is settled into the first configuration as shown in FIGS. 4A-4B, the U-shaped tube 130 is bended within the bending plane 130S that is substantially parallel to the surface of the horizontal platter 80. When the four-bar apparatus is settled into the second configuration as shown in FIGS. 5A-5B, the U-shaped tube 130 is bended within the bending plane 130S that is substantially perpendicular to the surface of the horizontal platter 80, and each end (e.g., 138L or 138R) of the U-shaped tube 130 is in contact with the horizontal platter 80 to lift and support one side of the first side bar 120L or the second side bar 120R.

Additionally, in some implementations (not shown in the figures), a trench can be formed atop the horizontal platter 80 for holding a part of the U-shaped tube below the surface of the horizontal platter when the four-bar apparatus is settled into the first configuration. Furthermore, in some implementations, the back bar 130 does not have to be in the form of a U-shaped tube as shown in FIGS. 4A-4B and FIGS. 5A-5B, and this back bar 130 can be formed with a strip of plate as well. Similarly, in some implementations, the front bar 110 does not have to be in the form of a strip of plate as shown in FIGS. 4A-4B and FIGS. 5A-5B, and this front bar 110 can be formed with a U-shaped tube as well. In some implementations, the four-bar apparatus can be permanently mounted with the horizontal platter 80. In other implementations, the four-bar apparatus can be detachably mounted with the horizontal platter 80.

In some implementations as shown in FIGS. 4A-4B, FIGS. 5A-5B, and FIG. 6, the multi-planer workstation 10 includes a four-bar apparatus that has a front bar 110, a back bar 130, a first side bar 120L, and a second side bar 120R all atop the horizontal platter 80. These four bars can be joined together with pivotal structures. The front bar 110 can join each of the first side bar 120L and the second side bar 120R with a front pivot to allow the front bar 110 rotate with respect to a first horizontal axis 112 that is parallel to the surface of the horizontal platter 80. The back bar 130 can join each of the first side bar 120L and the second side bar 120R with a back pivot to allow the back bar 130 rotate with respect to a second horizontal axis 132 that is parallel to the surface of the horizontal platter 80. The first horizontal axis 112 can be substantially parallel to the second horizontal axis 132.

Figure 6:
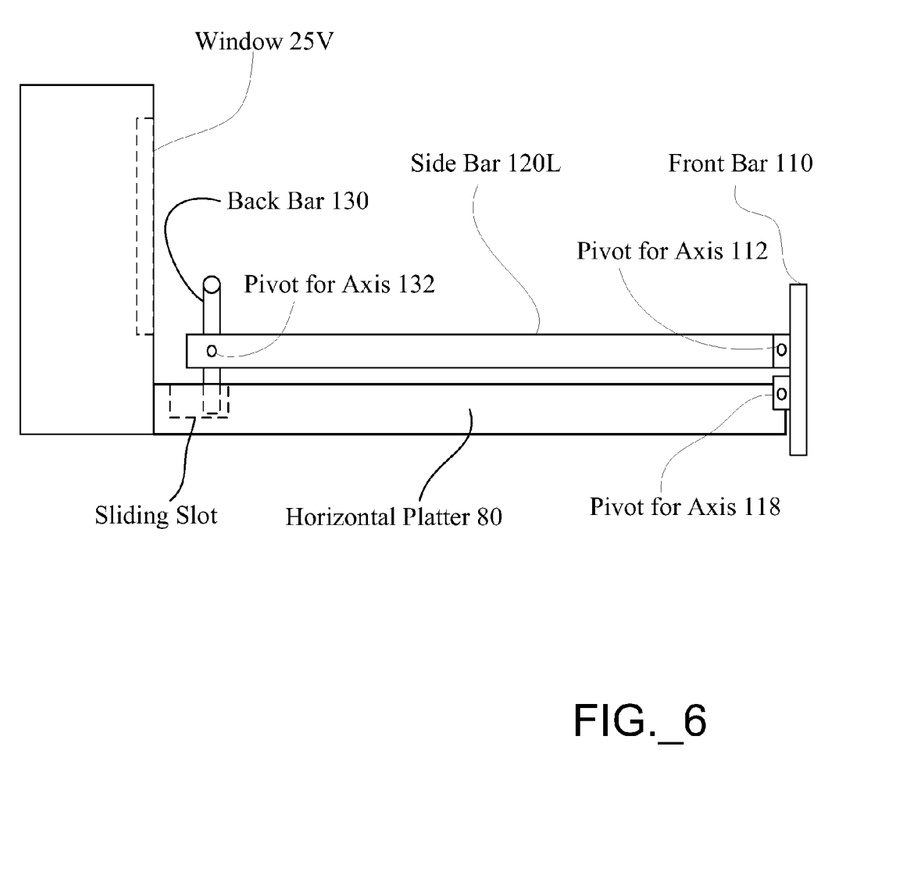
FIG. 6 shows a the multi-planer workstation includes a four-bar apparatus having four bars joined together with pivotal structures in accordance with some embodiments.

Additionally, the front bar 110 can include a strip of plate. In some implementations, the strip of plate 110 can join the horizontal platter 80 with at least one pivot to allow the strip of plate rotate with respect to a third horizontal axis 118 that is parallel to the first horizontal axis 112. In other implementations, the strip of plate 110 can join the horizontal platter 80 with two pivots (e.g., one pivot on each side of the horizontal platter 80) to allow the strip of plate rotate with respect a third horizontal axis 118 that is parallel to the first horizontal axis 112. In some implementations, the back bar 130 includes U-shaped tube bent within a bending plane 130S that is rotatable with respect to the second horizontal axis 132. In some implementations (not shown in the figures), the back bar 130 can include a strip of plate that is rotatable with respect to the second horizontal axis 132.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

For example, the multi-planer workstation 10 in FIGS. 4A-4B and 5A-5B can include an imaging scanner having one or more imaging sensors, but the four-bar apparatus can also be implemented on a workstation that includes a laser scanner with scanning laser beams, or be implemented on a workstation that includes both an imaging scanner and a laser scanner. The four-bar apparatus can be implemented on a workstation that has more than two windows. A window of the workstation can be associated with one field of view, two fields of view, three fields of view, or more than three fields of view.

In one aspect, a workstation includes a housing, a first window located in an upright plane, a second window located in a generally horizontal plane that intersects the upright plane, a controller in the housing operative to read a barcode from at least one of the first window and the second window, and weighing system having a horizontal platter operative to measure the weight of produce exerting gravitational force on the horizontal platter. The workstation also includes a four-bar apparatus having a front bar, a back bar, a first side bar, and a second side bar all atop the horizontal platter. The four-bar apparatus is operative to be settled into one of a first configuration and a second configuration. Here, the upper edge of each of the front bar, the back bar, the first side bar, and the second side bar has an average height at the second configuration larger than the average height thereof at the first configuration.

In some implementations, the workstation can include at least one solid-state imager supported by the housing and having an array of image sensors with a field of view, an optical system supported by the housing and operative for splitting the field of view of the at least one imager into a plurality of subfields of view that simultaneously extend through the at least one of the first window and the second window. The workstation can further include a plurality of energizable illumination light over an adjustable illumination time, the optical system being further operative for capturing the illumination light returned from the barcode in each subfield of view along respective optical paths from one of the windows to the at least one imager. In some implementations, the workstation can include a scanning mirror, a laser diode projecting a laser beam onto the scanning mirror to create a scanning laser beam, and a photo-detector to detect light reflected from the barcode when the scanning laser beam is projected onto the barcode through one of one of the first window and the second window.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having,"

"includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter

What is claimed is:

1. A workstation comprising:
   a housing;
   a first window located in an upright plane;
   a second window located in a generally horizontal plane that intersects the upright plane;
   a controller in the housing operative to read a barcode from at least one of the first window and the second window;
   a weighing system having a horizontal platter operative to measure the weight of produce exerting gravitational force on the horizontal platter; and
   a four-bar apparatus having a front bar, a back bar, a first side bar, and a second side bar atop the horizontal platter, the front bar joining each of the first side bar and the second side bar with a front pivot to allow the front bar to rotate with respect to a first horizontal axis that is parallel to the surface of the horizontal platter, the back bar joining each of the first side bar and the second side bar with a back pivot to allow the back bar to rotate with respect to a second horizontal axis that is parallel to the surface of the horizontal platter, wherein the first horizontal axis is substantially parallel to the second horizontal axis.

2. The workstation of claim 1, wherein the four-bar apparatus is operative to be settled into one of a first configuration and a second configuration while keeping the horizontal platter leveled horizontally, wherein the upper edge of each of the front bar, the back bar, the first side bar, and the second side bar has an average height at the second configuration larger than the average height thereof at the first configuration.

3. The workstation of claim 2, wherein the first side bar and the second side are predominantly positioned below the upper surface of the horizontal platter when the four-bar apparatus is settled into the first configuration.

4. The workstation of claim 2, wherein the first side bar and the second side are predominantly positioned above the upper surface of the horizontal platter when the four-bar apparatus is settled into the first configuration.

5. The workstation of claim 2, wherein the front bar includes a strip of plate having a plate surface substantially parallel to the surface of the horizontal platter when the four-bar apparatus is settled into the first configuration.

6. The workstation of claim 2, wherein the front bar includes a strip of plate having a plate surface substantially perpendicular to the surface of the horizontal platter when the four-bar apparatus is settled into the second configuration.

7. The workstation of claim 2, wherein the front bar includes a strip of plate having a plate surface forming an inclined angle of more than 45 degrees with respect to the surface of the horizontal platter when the four-bar apparatus is settled into the second configuration.

8. The workstation of claim 2, wherein the back bar includes a U-shaped tube bent within a bending plane substantially parallel to the surface of the horizontal platter when the four-bar apparatus is settled into the first configuration.

9. The workstation of claim 2, wherein the back bar includes a U-shaped tube having each end thereof in contact with the horizontal platter to lift and support one side of either the first side bar or the second side bar when the four-bar apparatus is settled into the second configuration.

10. The workstation of claim 2, wherein the four-bar apparatus is permanently mounted with the horizontal platter.

11. The workstation of claim 2, wherein the four-bar apparatus is detachably mounted with the horizontal platter.

12. The workstation of claim 1, wherein the front bar includes a strip of plate joining the horizontal platter with at least one pivot to allow the strip of plate to rotate with respect to a third horizontal axis that is parallel to the firs horizontal axis.

13. The workstation of claim 1, wherein the front bar includes a strip of plate joining the horizontal platter with two pivots to allow the strip of plate rotate with respect to a third horizontal axis that is parallel to the firs horizontal axis.

14. The workstation of claim 1, wherein the back bar includes U-shaped tube bending within a bending plane that is rotatable with respect to the second horizontal axis.

15. The workstation of claim 1, wherein the back bar includes a strip of plate that is rotatable with respect to the second horizontal axis.

* * * * *